(12) United States Patent
Harbin et al.

(10) Patent No.: US 7,159,010 B2
(45) Date of Patent: Jan. 2, 2007

(54) NETWORK ABSTRACTION OF INPUT/OUTPUT DEVICES

(75) Inventors: Donald B. Harbin, Scottsdale, AZ (US); Susan Kromenaker, Chandler, AZ (US); Mark Wunderlich, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 890 days.

(21) Appl. No.: 10/071,312

(22) Filed: Feb. 6, 2002

(65) Prior Publication Data

US 2003/0149773 A1 Aug. 7, 2003

(51) Int. Cl.
*G06F 15/16* (2006.01)
(52) U.S. Cl. ............... 709/207; 709/202; 709/203; 709/206; 709/219; 709/224; 709/226; 709/230; 370/386; 370/428
(58) Field of Classification Search ............ 709/202, 709/203, 206, 207, 219, 224, 226, 330; 370/386, 370/428
See application file for complete search history.

(56) References Cited

U.S. PATENT DOCUMENTS

2002/0040393 A1* 4/2002 Christensen ............ 709/224
2002/0087663 A1* 7/2002 Chou et al. ............ 709/219
2002/0114341 A1* 8/2002 Sutherland et al. ........ 370/428
2002/0161934 A1* 10/2002 Johnson et al. ............ 709/330
2003/0043794 A1* 3/2003 Cayton et al. ............ 370/386
2003/0079018 A1* 4/2003 Lolayekar et al. ......... 709/226

OTHER PUBLICATIONS

InfiniBand Architecture Specification, vol. 1, Rel. 1.0, Oct. 24, 2000, InfiniBand Trade
Intel 80303 I/0 Processor Developer's Manual, Jun. 2000, Chapter 1.

* cited by examiner

*Primary Examiner*—Yves Dalencourt
(74) *Attorney, Agent, or Firm*—Grossman, Tucker, Perreault & Pfleger, PLLC

(57) ABSTRACT

A topology of storage nodes coupled to a network to provide storage resources to clients coupled to the network is described. A common transport agent (CTA) comprises a common communication interface with each of the storage nodes. The common communication interface with each storage node may be independent of any particular input/output format to be used in storing data in or retrieving data from a storage medium associated with the storage node. The CTA may also comprise a communication interface with the network which is independent of any particular network protocol to transmit data over the network.

13 Claims, 5 Drawing Sheets

NETWORK ABSTRACTION OF INPUT/OUTPUT DEVICES

BACKGROUND

1. Field

The subject matter disclosed herein relates to systems and methods for storing data. In particular, the subject matter disclosed herein relates to modular management of scalable storage resources.

2. Information

Current increases in Internet usage and reliance by enterprises on information technology has accelerated the development of large and scalable systems for providing storage resources. Solutions proposed by the Infiniband® Trade Association provide an input/output (I/O) architecture enabling scalable storage solutions for enterprise networks and Internet service providers to be built from low cost storage building blocks. However, there is a need to provide greater modularity among subsystems in storage solutions to lower costs associated with integrating hardware from different sources.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
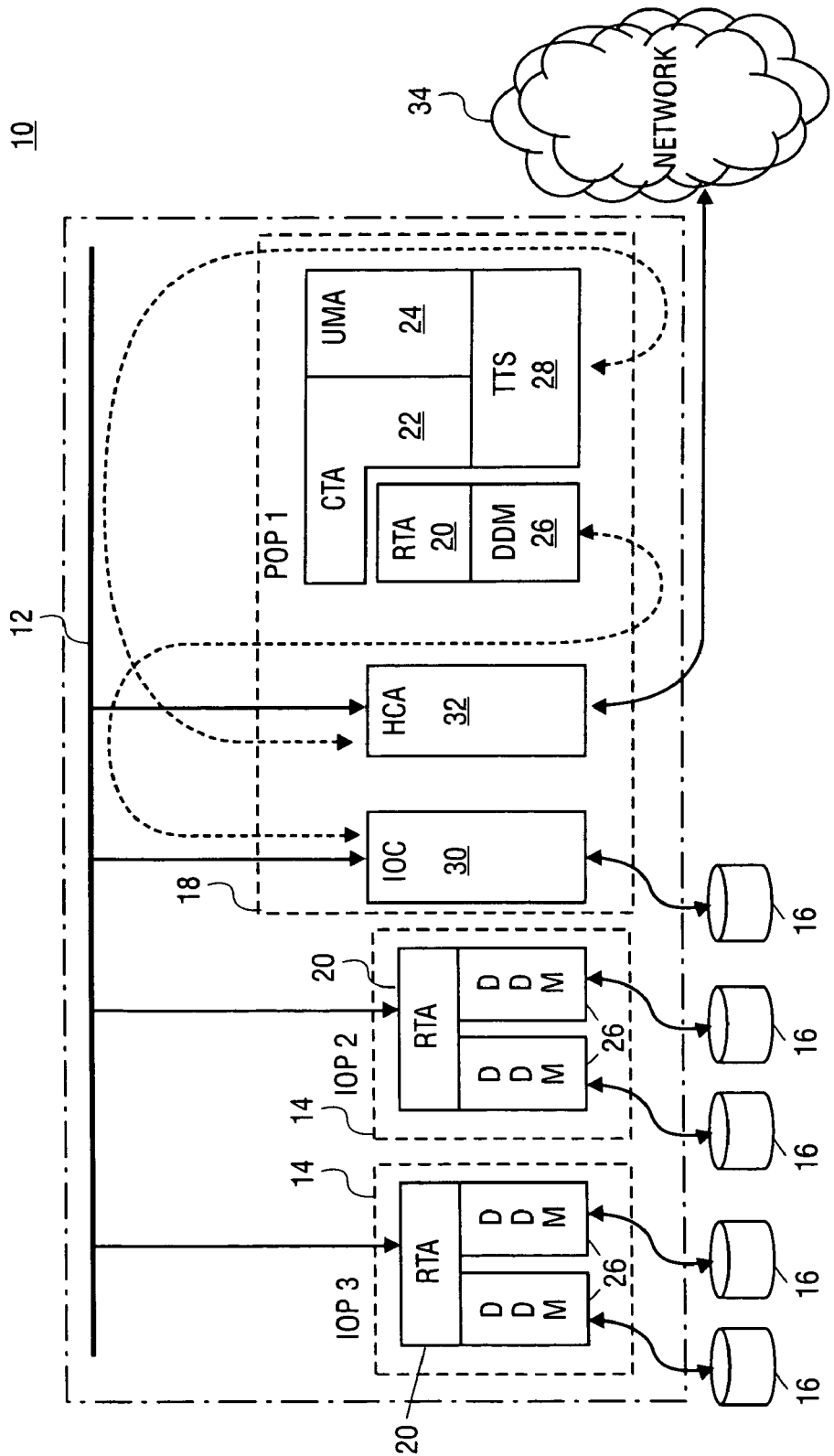
FIG. 1 shows a schematic diagram of a topology comprising storage nodes according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Storage medium" as referred to herein relates to media capable of maintaining expressions of data. For example, a storage medium may comprise one or more storage devices for storing data or machine-readable instructions in a particular format. Such storage devices may comprise devices capable of maintaining expressions of data in media such as, for example, magnetic, optical or semiconductor media. However, these are merely examples of storage media and embodiments of the present invention are not limited in these respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise machine-executable instructions stored in a memory in combination with processing circuitry to execute such instructions. However, these are merely examples of structures which may provide logic and embodiments of the present invention are not limited in these respects.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and a peripheral device and embodiments of the present invention are not limited in these respects.

A "data bus" as referred to herein relates to circuitry for transmitting data between devices. For example, a data bus may transmit data between a host processing system and a peripheral device. However, this is merely an example of a data bus and embodiments of the present invention are not limited in this respect. A "bus transaction" as referred to herein relates to an interaction between devices coupled in a bus structure wherein one device transmits data addressed to the other device through the bus structure.

A "buffer" or "data buffer" as referred to herein relates to a portion of a memory in which data may be temporarily stored and then retrieved. Such a data buffer may be defined by an address and a data size. However, this is merely an example of a data buffer and embodiments of the present invention are not limited in this respect.

A "shared memory" as referred to herein relates to a portion of memory which is accessible by more than one device or process. A shared memory may be accessible by multiple processing systems or devices in a processing platform. For example, a processing system may store data in a shared memory which is to be processed by device having access to the shared memory. Also, a processing system may define shared memory for processes hosted on the processing system. However, these are merely examples of a shared memory and embodiments of the present invention are not limited in these respects.

A data bus may transfer data between devices or bus agents in a processing platform using a "direct memory access" (DMA) through which data may be transferred in the data bus independently of one or more processes hosted on a processing system. For example, a device coupled to a data bus structure may act as a bus master to initiate bus transactions to store or retrieve data in memory associated with bus agents. In another example, a first process hosted on a processing system may initiate a DMA transaction to write data to or read data from buffers defined locally to a second process hosted on the processing system. However, these are merely examples of DMA systems and embodiments of the present invention are not limited in these respects.

A "transmission medium" as referred to herein relates to any media suitable for transmitting data. A transmission medium may include any one of several mediums including, for example transmission cabling, optical transmission medium or wireless transmission media. Also, a transmission medium may comprise combinations of two or more of the aforementioned media. However, these are merely examples of transmission media and embodiments of the present invention are not limited in these respects.

An "object" as referred to herein relates to an entity which is identifiable by one or more processes. For example, an object may comprise a data item or a procedure call in a processing system. Such an object may be associated with identification information understood by processes that communicate with one another. However, these are merely examples of objects and embodiments of the present invention are not limited in these respects.

An "interface" as referred to herein relates to a boundary across which processes meet and act on or communicate with each other. For example, an interface may define "common objects" between processes on one or more processing systems. However, this is merely an example of an interface and embodiments of the present invention are not limited in this respect.

A "method interface" as referred to herein relates to an interface through which related software components or processes may communicate according to a pre-defined syntax. For example, a software component may define a method interface to provide one or more objects in a procedure or function call. Also, an application programming interface (API) may define one or more method interfaces to facilitate communication between processes. However, these are merely examples of a method interface and embodiments of the present invention are not limited in this respect.

A "network" as referred to herein relates to a system of transmitting information in a transmission medium between or among transmission points. A network may define addresses to be associated with one or more receiving points to receive data. However, this is merely an example of a network and embodiments of the present invention are not limited in these respects.

A "network protocol" as referred to herein relates to a format or process through which information may be transmitted in a transmission medium between or among devices. A communication protocol may be characterized by a data rate, modulation or encoding format or data encapsulation format. Also, a network protocol may, but not necessarily, be applicable to transmitting data in a particular transmission medium. Other network protocols may define communication formats which are independent of particular transmission media. For example, network protocol may be defined on any one of several layers of abstraction where an application layer defines a format for presenting data to application processes at a receiving point and a physical layer defines a format for transmitting data in a transmission medium between devices. However, these are merely examples of a network protocol and embodiments of the present invention are not limited in these respects.

A "communication adapter" as referred to herein relates to a device which may be coupled to a transmission medium to transmit data to or receive data from other devices coupled to the transmission medium. For example, a communication adapter may comprise any one of other I/O devices such as, for example, an adapter to a data storage system. In alternative embodiments, a communication adapter may comprise a network adapter adapted to transmit data to or receive data from devices coupled to a network such as a local area network (LAN) or storage area network (SAN). However, these are merely examples of a communication adapter and embodiments of the present invention are not limited in these respects.

A "device driver module" as referred to herein relates to a process hosted on a processing system to facilitate communication between a device and one or more other processes hosted on the processing system. For example, a device driver module may define one or more data items common with other processes on the processing system to enable data to be transmitted to or received from a peripheral device. However, this is merely an example of a device driver module and embodiments of the present invention are not limited in this respect.

"Storage resources" as referred to herein relates to an ability to provide one or more "storage services" to a client. Such storage services may include, for example, storing data in or retrieving data from a storage medium in response to client requests. However, these are merely examples of storage resources and storage services, and embodiments of the present invention are not limited in these respects.

A "node" as referred to herein relates to a device in a network or system associated with an address. For example, a node may comprise a device coupled to a data bus which may be addressed in data bus transactions according to a data bus protocol. Also, a node may comprise a device coupled to a network such that another node may communicate with the node using the address according to a network protocol. However, these are merely examples of a node and embodiments of the present invention are not limited in these respects.

A "storage node" as referred to herein relates to a node that comprises storage resources at an address associated with the storage node. For example, a storage node may respond to requests from clients to provide storage services transmitted to the storage node in messages transmitted to the storage node according to an address on a network or data bus. However, this is merely an example of a storage node and embodiments of the present invention are not limited in this respect.

"Discovery" as referred to herein relates to a process by which one or more nodes in a network or system may be identified or assessed. For example a discovery process may discover a node on a network to identify the node, associate the node with an address on the network, or determine status or characteristics of the node. However, this is merely an example of how a process may discover a node on a network and embodiments of the present invention are not limited in this respect.

An "input/output format" as referred to herein relates to a format in which information may be transmitted through or received from a communication channel. For example, an input/output format may define a format for transmitting data in a communication channel to or from a storage medium. However, this is merely an example of an input/output format and embodiments of the present invention are not limited in this respect.

A "common transport agent" (CTA) as referred to herein relates to a process hosted on a processing system to communicate with storage nodes and clients requesting storage services from the storage nodes. A CTA may comprise an interface with storage nodes comprising objects which are independent of a particular I/O format used by the storage nodes for transmitting data to or receiving data from a storage medium in response to requests for storage services. However, this is merely an example of a CTA and embodiments of the present invention are not limited in this respect.

Briefly, an embodiment of the present invention relates to a topology of storage nodes coupled to a network to provide storage resources to clients coupled to the network. A common transport agent (CTA) may comprise a common communication interface with each of the storage nodes. The common communication interface may define one ore more method interfaces which are independent of any particular I/O format used for storing data in or retrieving data from a storage medium associated with the storage node. However, this is merely an example embodiment and other embodiments of the present invention are not limited in these respects.

FIG. 1 shows a schematic diagram of a topology 10 comprising storage nodes coupled to a network 34 according to an embodiment of the present invention. A host storage node 18 is coupled to the network 34 through a host channel adapter 32 and coupled to storage nodes 14 through a data bus 12. The storage nodes 14 and 18 may comprise storage resources capable of providing storage services to clients in response to requests through the network 34. Such storage services may comprise, for example, storing data in or retrieving data from a storage medium. However, this is merely an example of how storage services may be provided to clients over a network and embodiments of the present invention are not limited in these respects.

Each of the storage nodes 14 and 18 may comprise an input/output (I/O) processor such as, for example, the 80303 I/O processor sold by Intel® Corporation. However, this is merely an example of an I/O processor and embodiments of the present invention are not limited in this respect. The I/O processor of a storage node 14 or 18 may be coupled to the data bus 12 to communicate with other devices on the data bus 12 according to a data bus protocol such as that described in PCI Local Bus Specification 2.2, Dec. 18, 1998. In this example, the data bus 12 may be coupled to a PCI-to-PCI bridge of the I/O processor as a secondary data bus. However, this is merely an example of how a storage node may be coupled to a data bus in a topology of storage nodes and embodiments of the present invention are not limited in this respect.

According to an embodiment, the storage nodes 14 and 18 may also comprise an I/O controller to store data in or retrieve data from a storage medium 16 coupled to the I/O controller. In the illustrated embodiment, for example, the host storage node 18 comprises an I/O controller 30 adapted to store data in or retrieve data from a storage medium 16 according to an I/O format such as, for example, I/O formats defined in versions of the Small Computer System Interface (SCSI) as defined by the American National Standards Institute (ANSI) or versions of the Advanced Technology Attachment (ATA) and developed by the Small Form Factor (SFF) Committee. However, these are merely examples of I/O formats and embodiments of the present invention are not limited in these respects.

It should be understood that the storage nodes 14 may each also comprise one or more I/O controllers (to store data in or retrieve data from associated storage media 16) such as the I/O controller 30 but are not shown in FIG. 1 for simplicity. In an embodiment in which the storage nodes 14 and 18 comprise an I/O processor such as the aforementioned 80303 I/O processor, the I/O controllers may be configured to coupled to a primary or secondary data bus of a PCI-to-PCI bridge formed as part of the I/O processor. However this is merely an example of how a storage node may be integrated with storage media and embodiments of the present invention are not limited in this respect.

The network 34 may comprise subsystems to transport data on a transmission medium according to a network protocol to service requests from client processes (not shown) coupled to the network 34. For example, the network 34 may comprise one or more switch fabrics and control circuitry to form a storage area network (SAN). In the illustrated embodiment, the host storage node 18 comprises a host channel adapter (HCA) 32 to communicate with the network 34 according to a network protocol such as, for example, network protocols defined in the Infiniband Architecture Specification, Vol. 1, Release 1.0, Oct. 24, 2000, Infiniband Trade Association (hereinafter the "Infiniband Architecture Specification"), versions of standard IEEE 802.3 and the like. However, these are merely examples of network protocols and embodiments of the present invention are not limited in these respects.

Clients (not shown) coupled to the network 34 may transmit requests to the host storage node 18 for storage services. The host storage node 18 may comprise a processing system to host processes to communicate with the network 34 and the other storage nodes 14. Such processes may comprise a target transport services (TTS) module 28, unit management agent (UMA) 24 and common transport agent (CTA) 22. These processes may be controlled by the execution of machine-readable instructions retrieved from a storage medium by a processor (not shown) at the host storage node 18.

The TTS module 28 may comprise interfaces with the CTA 22 and UMA 24 comprising one or more method interfaces that are independent of the particular network protocol defined for communication between the host storage node 18 and the network 34. For example, the interfaces between the TTS module 28 and either the CTA 22 or UMA 24 may define one or more method interfaces in an application programming interface (API) which are independent of the particular network protocol.

In the illustrated embodiment, a processing system at each of the storage nodes 14 and 18 may host one or more device driver modules (DDMs) 26 to communicate with an I/O controller (e.g., I/O controller 30) at the storage node. A DDM 26 may comprise, for example, driver layers to implement a protocol stack to communicate with a redundant array of independent disks (RAID) in a communication channel according to an I/O format. In the illustrated embodiment, each of the storage nodes 14 and 18 may host an instance of a remote transport agent (RTA) 20 defining a common interface with the CTA 22. For example, the CTA may define an interface with each instance of the RTA 20 comprising objects which are common with these portions of the RTA 20 in an API. The API may define one or more method interfaces which are independent of the particular DDM 26 (e.g., independent of the particular I/O format used to store data in or retrieve data from a storage medium), and independent of the particular network protocol used for communication between the host storage node 18 and the network 34. In one embodiment, the instances of the RTA 20 hosted on the storage nodes 14 to communicate with the CTA 22 through bus transactions initiated on the data bus 12. However, this is merely an example of how an interface may be defined between a CTA and an RTA, and embodiments of the present invention are not limited in these respects.

According to an embodiment, the UMA 24 may identify storage resources at the storage nodes 14 and 18, communicate the availability of such storage resources to clients on the network 34 and establish "connections" between clients on the network 34 and the storage resources provided by the storage nodes 14 and 18. For example, the UMA 24 may poll each instance of the RTA 20 at a storage node to characterize the storage resources at the storage node associated with the RTA, and advertise the availability of such resources to clients on the network 34. The UMA 24 may then respond to requests from the clients on the network 34 for connections to storage resources on the storage nodes, and maintain routing information to be used in servicing subsequent requests for storage services through these connections.

Figure 2:
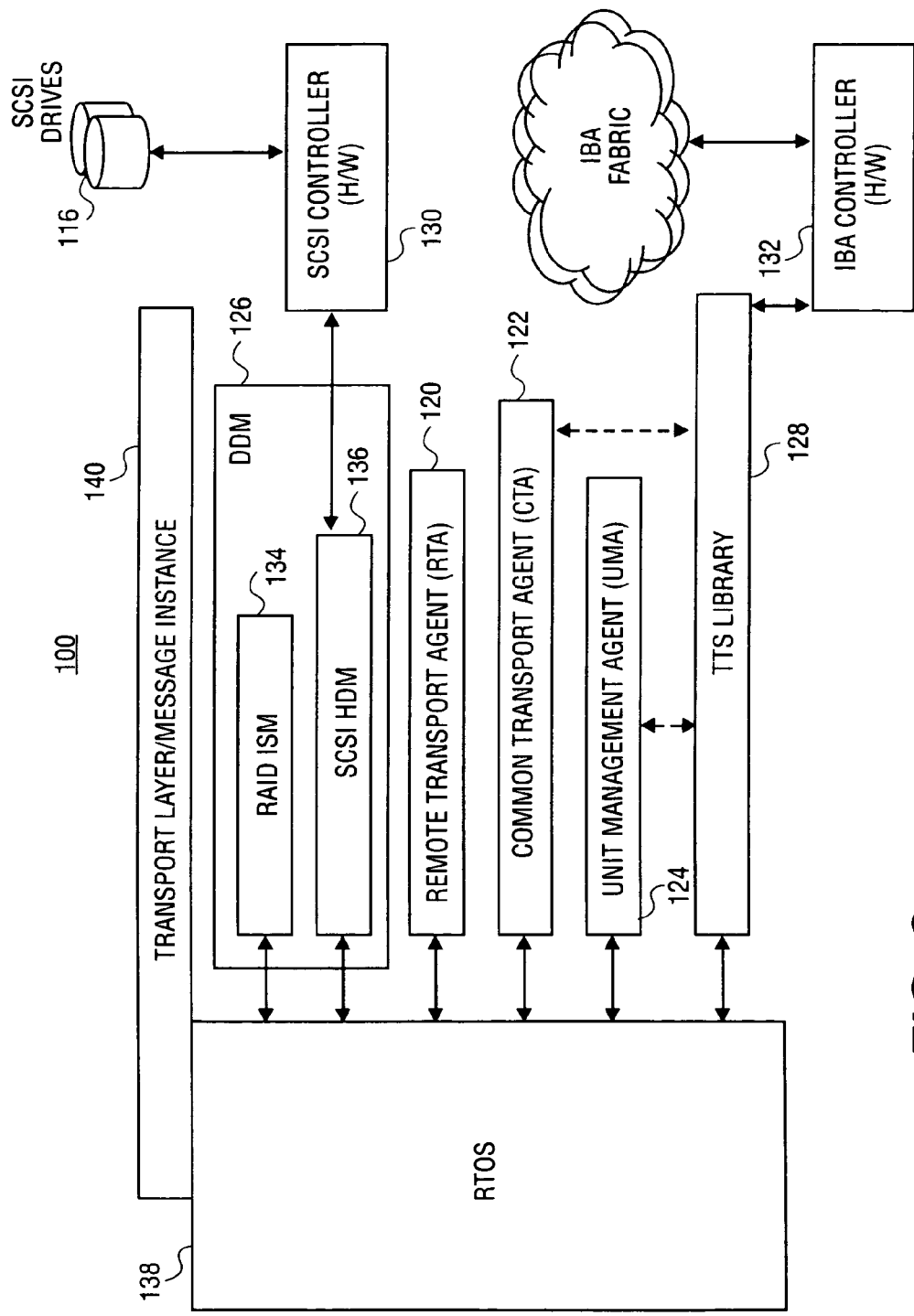
FIG. 2 shows a diagram of a software system of a storage node according to an embodiment of the topology shown in FIG. 1.

FIG. 2 shows a diagram of a software system 100 hosted on a processing system of a host storage node according to an embodiment of the topology shown in FIG. 1. The software system 100 comprises a real-time operating system (RTOS) 138 to allocate processing resources of the processing system to an RTA 120, CTA 122, UMA 124, instances of a TTS library 128 and a DDM 126. The RTOS 138 may comprise an IxWorks™ or other RTOS sold by Wind River Systems, Inc. However, these are merely examples of an RTOS that may be hosted on a storage node and embodiments of the present invention are not limited in this respect. It should be understood that the RTOS 138, RTA 120, CTA 122, UMA 124, DDM 126 and instances of the TTS library 128 may be controlled through the execution of machine-readable instructions retrieved from a storage medium (not shown) by one or more processors in a processing system.

In the presently illustrated embodiment, the software system 100 may be coupled to a SCSI controller 130. The DDM 126 comprises drivers 134 and 136 which are adapted to communicate with the controller 130 and manage resources at storage devices 116. For example, the driver 136 may control the controller 130 to store data in or retrieve data from the storage devices using an I/O format. However, this is merely an example of how a software system may be adapted to communicate with an I/O system to provide storage services to clients on a network and embodiments of the present invention are not limited in this respect.

The software system 100 may also be coupled to a network through an Infiniband controller 132. The network may comprise an Infiniband fabric 134. A TTS library 128 of Infiniband compatible modules may provide instances of processes to enable the CTA 122 and UMA 124 to communicate with clients through the Infiniband fabric 134. However, this is merely an example of how a software system may be adapted to communicate with clients on a network and embodiments of the present invention are not limited in this respect.

Figure 3:
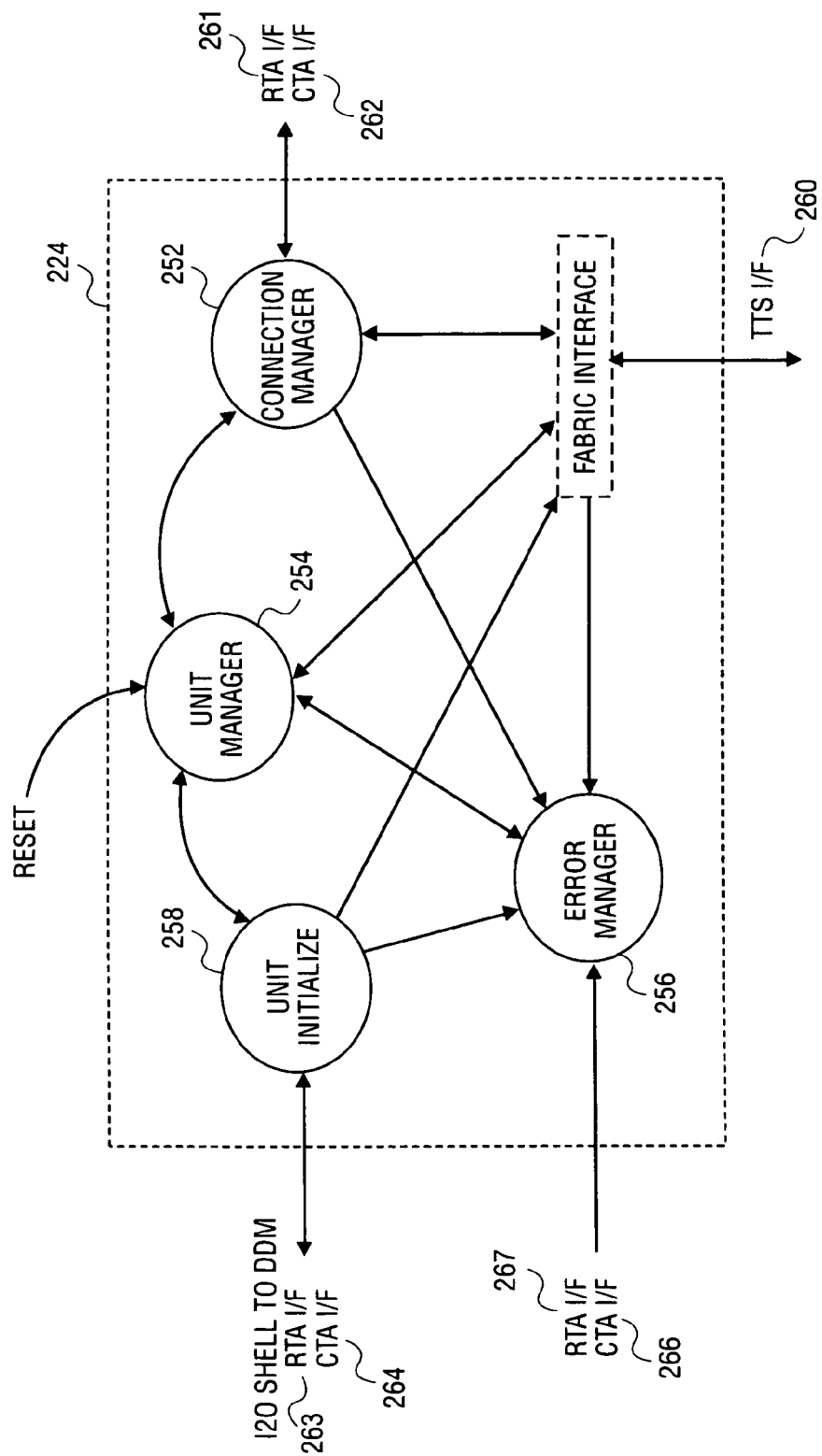
FIG. 3 shows a flow diagram of a unit management agent software component according to an embodiment of the software system shown in FIG. 2.
Figure 4:
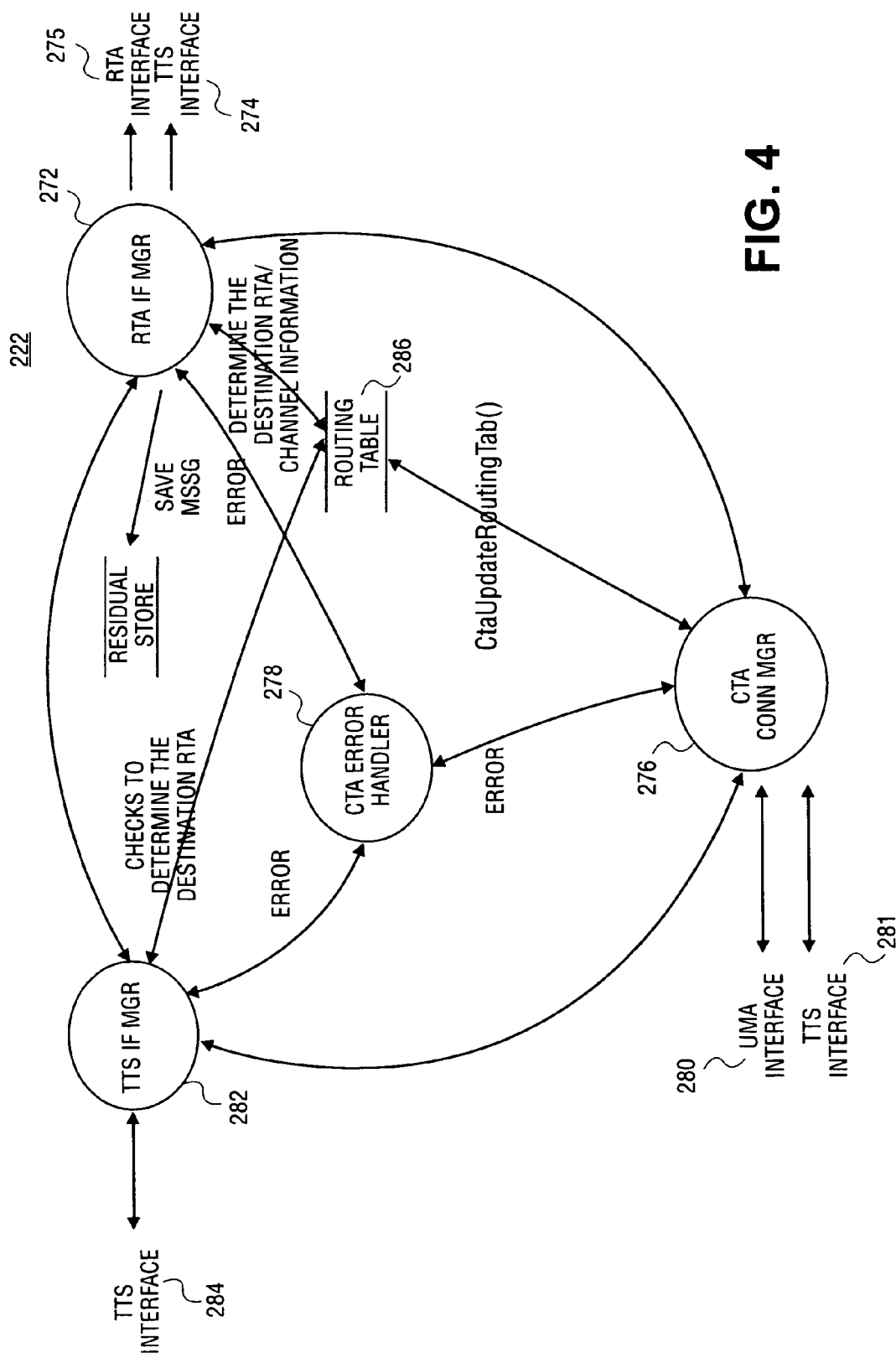
FIG. 4 shows a flow diagram of a common transport agent software component according to an embodiment of the software system shown in FIG. 2.
Figure 5:
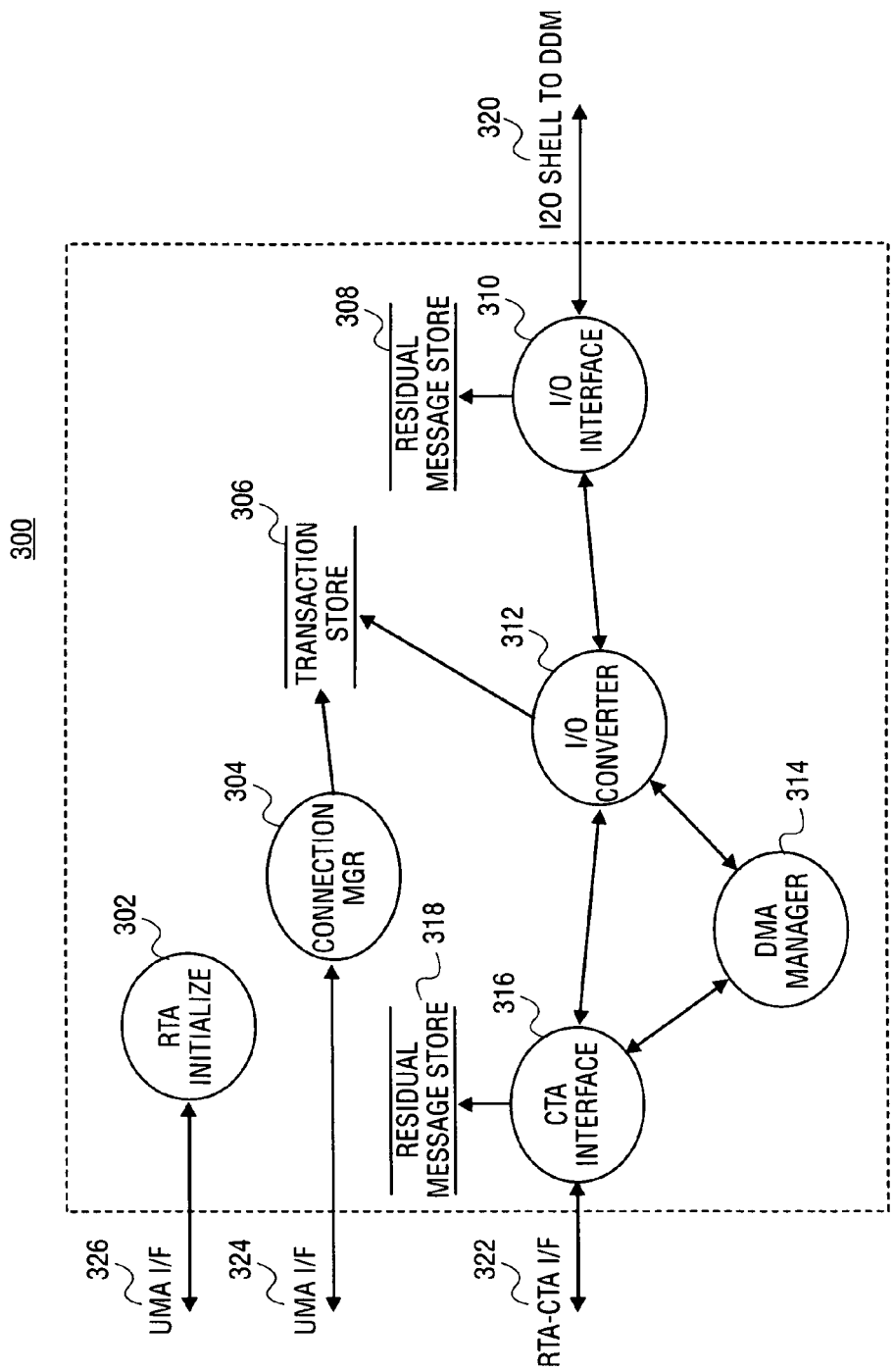
FIG. 5 shows a flow diagram of a software system to provide a remote transport agent software component according to an embodiment of the software system shown in FIG. 2.

FIGS. 3, 4 and 5 show data flow diagrams of portions of a software system hosted on a processing system of a host node according to an embodiment of the present invention as illustrated with reference to FIG. 2. FIG. 3 shows a data flow diagram of a software system 224 according to an embodiment of the UMA 124 shown in FIG. 2. The software system 224 comprises interfaces 261, 263 and 267 with instances of the RTA 120. According to an embodiment, the interfaces 261, 263 and 267 may each comprise an API of method interfaces which are independent of each DDM associated with each instance of the RTA 120, and independent of an I/O format used by the DDM to store data in or retrieve data from a storage medium. Accordingly, the software system 224 need not be modified to accommodate each DDM or particular I/O format to be used by a storage node in storing data in or retrieving data from a storage medium. Similarly, the software system 224 comprises an interface 260 with instances of the TTS library 128. According to an embodiment, the interface 260 may comprise an API of one or more method interfaces which are independent of any particular network protocol being used by the TTS instances to communicate with clients over the network 134. Accordingly, the software system 224 need not be modified to accommodate changes in the network protocol being used to communicate with clients through the network 34.

In response to a reset event detected at an RTOS, a unit manager 254 may call a unit initialize module 258 to initialize the UMA by, for example, initiating calls to DDMs through an interface 263 to discover storage resources at storage nodes, processing responses from the interface 263 including information from the DDMs characterizing storage resources at associated storage nodes, and reporting such information back to the unit manager 254.

During system initialization, the software system 224 may request configuration information from devices at the storage nodes 14 and 18 (and associated with the DDMs) through the interface 263. The software system 224 may then forward this information (e.g., information characterizing storage resources at the storage nodes 14 and 18 such as device profiles) to a network (e.g., a network fabric) through the interface 260. This information may include, for example, storage device profiles and a hardware resource table. In the presently illustrated embodiment, the interface 260 communicates with an instance of the TTS library 128. In an example in which the TTS instance communicates with the network according to an Infiniband network protocol, for example, the TTS instance may advertise the available storage resources to the network as illustrated in Chapters 14 and 15 of the Infiniband Architecture Specification without providing device specific information. Accordingly, the software system 224 may be modified to support different network topologies without modifying instances of the RTA 20 to reside at the storage nodes 14 and 18. However, this is merely an example of how storage resources may be advertised to a network and embodiments of the present invention are not limited in this respect. The unit initialize module 258 may then call the RTOS 138 to spawn the RTA 20 to each of the discovered storage nodes, form a data structure with the obtained device profile information and return control to the unit manager 254.

In the illustrated embodiment, the UMA 224 may also establish "connections" between the advertised storage resources and clients (e.g., through the network 34) in response to requests received from an interface 260 at the connection manager 252. Upon completion of the initialization processes performed by the unit initialize module 258, the unit manager 254 may prompt the connection manager 252 to establish network requested connections enabling clients to receive services in response to requests. The connection manager 252 may call the CTA 122 through an interface 262 to initiate a connection between a client (e.g., coupled to a specific network fabric connection) and an instance of the RTA 20 hosted on the storage node to provide storage services. The connection manager 252 may also call affected instances of the RTA 20 on an interface 261 to initiate connections. In the illustrated embodiment, the interfaces 261 and 262 may each comprise one or more method interfaces in an API that are independent of any particular I/O format being used by the storage nodes providing the storage resources and independent of an particular network protocol used for transmitting information between the TTS instances and clients on the network 34. Accordingly, the network protocol or I/O formats may be changed without changing the connection manager 252 of the software system 224.

FIG. 4 shows a schematic diagram of a software system 222 according to an embodiment of the CTA 122 shown in FIG. 2. In the illustrated embodiment, the CTA 122 may respond to requests received at the UMA 124 from clients for a connection to an instance of an RTA 20. Once a connection is established with a client, the CTA 122 may respond to requests from the client (for storage services) in the form of service requests including Remote DMA (RDMA) read and write requests received at an interface 274.

The software system 222 comprises an interface 275 with instances of the RTA 20. According to an embodiment, the interface 275 may comprise an API of one or more method interfaces which are independent of each DDM associated with each instance of the RTA 20 and independent of any I/O format used by the DDM. Accordingly, the software system 222 need not be modified to accommodate each DDM or particular I/O format to be used by a storage node in storing data in or retrieving data from a storage medium. Similarly, the software system 222 comprises interfaces 274, 281 and 284 with instances of the TTS library 128. According to an embodiment, the interfaces 274, 281 and 284 may each comprise an API of one or more method interfaces which are independent of any particular network protocol being used by the TTS instances to communicate with clients over the network 134. Accordingly, the software system 224 need not be modified to accommodate changes in the network protocol being used to communicate with clients through the network 34.

According to an embodiment, a CTA connection manager module 276 may receive requests for a connection from the UMA 124 at an interface 280. In response to such a request, the CTA connection manager module 276 may update a routing table 286 with information regarding the requested connection (e.g., information identifying a network address of the client originating the request and information identifying an affected instance of the RTA 20). The CTA connection manager module 276 may then return status back to the UMA on the interface 280 in response to the request for establishing the connection. However this is merely an example of establishing a connection to provide storage resources to a client on a network and embodiments of the present invention are not limited in these respects.

Following the establishment of a connection with a client (to provide storage resources), the CTA 122 may respond to service requests such as RDMA read requests from the client received at the TTS interface 284. In response to an RDMA read request, the TTS interface manager 282 may forward the service request to the RTA interface manager 272. The RTA interface manager 272 may then call the instance of the RTA 20 associated with the established connection (associated with the RDMA read request) using the interface 275 to forward the request according to the routing table 286. The called RTA instance may then retrieve the requested data (e.g., from locations on storage devices), store the retrieved data in local buffers (e.g., buffers referenced by a scatter gather list defined by an associated DDM) and callback to the CTA 122 on the interface 275. The CTA 122 may then call a TTS instance on the interface 284 to transfer the requested data that had been stored locally.

In response to the call from the CTA 122 on the interface 284, the affected TTS instance may transfer the requested data and notify the CTA 122 of completion of the transfer. In response to the notification of completion from the TTS instance, the CTA 122 may forward a completion message to the requesting RTA 20 through the RTA interface 275. However, this is merely an example of how a CTA may respond to an RDMA read request and embodiments of the present invention are not limited in this respect.

Following the establishment of a connection with a client (to provide storage services), the CTA 122 may also respond to RDMA write requests from the client received at a TTS instance in a manner similar to responding to RDMA read requests as illustrated above. However, in servicing an RDMA write request, the CTA 122 may read the data to be written (to the storage nodes) from the TTS interface 284 instead of writing the data to be read (from the storage nodes) to the TTS interface. However, this is merely an example of how a CTA may service an RDMA write request and embodiments of the present invention are not limited in this respect.

FIG. 5 shows a data flow diagram of a software subsystem 300 according to an embodiment of the RTA 120 shown in FIG. 2. While the RTA 120 is shown as residing on a host storage node, it should be understood that the following description of the RTA software sub-system in FIG. 5 also applies to the software systems of other storage nodes. As discussed above, an instance of RTA 120 may be spawned on a storage node by the UMA 124 in response to a reset event. Upon being spawned, the RTA may call a DDM on an interface 320 to receive information characterizing the storage resources controlled by the DDM 126. Such information may comprise, for example, information characterizing an I/O controller (e.g., device ID) or information quantifying available storage space on a storage medium. Upon request from the CTA 122, the RTA instance may send to the CTA 122 the information characterizing the storage resources gathered by the UMA 124. The CTA 122 may then advertise this information to the network 134.

Following initialization, an RTA instance may remain idle until a connection add message is received at a connection manager 304 from the UMA 124 on interface 324. The connection manager 304 may then maintain a transaction store table 306 which may include information for managing the routing of packets between the CTA 122 and DDM 26 for each connection.

The software system 300 comprises interfaces 324 and 326 with the UMA 124, and comprises an interface 322 with the CTA 122. According to an embodiment, the interfaces 322, 324 and 326 may each comprise method interfaces in an API which are independent of an I/O format used by each DDM 26. Accordingly, neither the UMA 124 nor the CTA 122 need be modified to accommodate each DDM 26 or particular I/O format to be used by a storage node in storing data in or retrieving data from a storage medium.

An I/O converter 312 may receive sequential messages from a CTA interface 316 or DMA manager 314, and reformat these messages in an I/O format such as, for example, I/O commands compatible with a SCSI interface or ATA interface. The I/O converter 312 may also receive messages from an I/O interface 310 in a format native to this I/O format, and reformat these messages according to an API to be forwarded on an interface 322. The I/O converter 312 may also access the transaction store table 306 to obtain routing information for forwarding data to clients through connections established by the UMA 124.

The DMA manager 314 may process RDMA read or write requests according to an I/O protocol such as, for example, RDMA requests according to the Infiniband Architecture Specification. The DMA manager 314 may obtain and release buffers to be used as source and destination memory locations in the processing of RDMA requests. Additionally, the DMA manager 314 may update message frames received from the I/O converter 312 to reference buffer locations containing valid data prior to returning the message frames back to the I/O converter 312.

The software sub-system 300 comprises a CTA interface 316 to transmit messages between the CTA and an I/O interface 310. The I/O interface 310 may likewise transmit calls between the DDM and the CTA interface 316. The CTA interface 316 and I/O interface 310 may each maintain a residual message store table to store transmitted messages and data used for flow control to enable retransmission of messages if no acknowledgement is received in response to such messages.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   a communication adapter coupled to a transmission medium to transmit and receive data according to a network protocol, said communication adaptor configured to receive and respond to requests for storage services from clients,
   a data bus coupled to one or more storage nodes, each storage node comprising storage resources and logic to transmit data to or receive data from a storage medium according to an input/output format in response to said request for storage services from clients; and
   a first processing system to host a common transport agent, the common transport agent comprising a first interface comprising one or more method interfaces to communicate with each storage node independently of the input/output format of the storage node for transmitting data to or receiving data from the storage medium, and a second interface comprising one or more method interfaces to communicate with the communication adapter for communicating with said clients requesting storage services, the one or more method interfaces of the second interface being independent of the network protocol wherein the system further comprises a plurality of storage nodes coupled to the data bus; and wherein each of the storage nodes comprises an input/output controller coupled to a storage medium to store data in or retrieve data from the storage medium according to an input/output format; a second processing system to host a device driver module to communicate with the input/output controller according to the input/output format; and a remote transport agent to communicate with the first interface of the common transport agent independently of the input/output format.

2. The system of claim 1, wherein the processing system further comprises a unit management agent to discover the storage resources of the storage nodes and post an indication of the discovered storage resources to the network.

3. The system of claim 2, wherein the unit management agent comprises logic to establish a connection between a client on the network and a storage node in response to a connection request from the client.

4. The system of claim 1, wherein each of the storage nodes is coupled to a redundant array of independent disks through an input/output channel.

5. The system of claim 4, wherein the input/output channel comprises one of a small computer system interface and serial ATA adapter.

6. The system of claim 1, wherein the network protocol comprises a network protocol selected from one of Infiniband and TCP/IP.

7. A storage node comprising:
   an I/O controller to store data in and retrieve data from a storage medium according to an I/O format; and
   a processing system comprising:
      a device driver module to transmit data to and receive data from the I/O controller according to the I/O format; and
      a remote transport agent coupled to the device driver, the remote transport agent comprising a first interface to receive commands to store data in or retrieve data from the storage medium, the commands being defined in the first interface by one or more method interfaces which are independent of the I/O format, and comprising a second interface to receive requests to establish connections between clients and said storage medium for providing storage services to said clients wherein the storage node further comprises a communication adapter coupled to a network to communicate with clients requesting storage services according to a network protocol; and wherein the processing system further comprises a common transport agent, the common transport agent comprising: a first interface comprising one or more method interfaces to communicate with the remote transport agent independently of the input/output format; and a second interface comprising one or more method interfaces to communicate with the clients independently of the network protocol.

8. The storage node of claim 7, wherein the I/O format comprises an I/O format defined according to one of a version of SCSI and a version of ATA.

9. The storage node of claim 7, wherein the storage node is coupled to a data bus and the first interface comprises one or more method interfaces which are responsive to bus transactions received on the data bus.

10. The storage node of claim 9, wherein the first interface comprises one or more method interfaces to initiate bus transactions on the data bus.

11. The storage node of claim 7, wherein the processing system comprises a memory and the first interface comprises one or more method interfaces to initiate remote direct memory access transactions to transfer data between buffers in the memory and the storage medium.

12. The storage node of claim 7, wherein the processing system further comprises a unit management agent to discover the storage resources of one or more storage nodes and post an indication of the discovered storage resources to the network.

13. The storage node of claim 7, wherein the network protocol comprises a network protocol selected from one of Infiniband and TCP/IP.

* * * * *